(12) United States Patent
Gibbons et al.

(10) Patent No.: US 6,451,960 B1
(45) Date of Patent: *Sep. 17, 2002

(54) POLYIMIDES FOR OPTICAL ALIGNMENT OF LIQUID CRYSTALS

(75) Inventors: Wayne M. Gibbons, Bear, DE (US); Paul J. Shannon, Exton, PA (US); Hanxing Zheng, Wilmington, DE (US)

(73) Assignee: Elsicon, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/498,214

(22) Filed: Feb. 4, 2000

Related U.S. Application Data

(62) Division of application No. 08/859,404, filed on May 20, 1997, now Pat. No. 6,084,057.

(51) Int. Cl.$^7$ .................. C08G 73/10; C09K 19/00; G02B 6/00
(52) U.S. Cl. .................. 528/353; 528/170; 428/1.1; 428/473.5; 428/1.2; 428/1.26; 385/141; 349/1
(58) Field of Search ............. 528/353, 170; 385/141; 349/1; 428/473.5, 1.1, 1.2, 1.26

(56) References Cited

U.S. PATENT DOCUMENTS 4,974,941 A   12/1990  Gibbons et al. ............ 350/349
5,186,985 A    2/1993  Estes et al. ................. 428/1
6,043,337 A *  3/2000  Gibbons et al. ............ 528/353
6,084,057 A *  7/2000  Gibbons et al. ............ 528/353

OTHER PUBLICATIONS

Shigeki Ishibashi, Misako Hirayama, Tohru Matsuura, Polyimide with Flourinated Side Chains for Liquid Crystal Alignment, 1993 The month in the date of publication is not available, Mol. Cryst. Liq. Cryst., 1993, vol. 225, pp. 99–105.

A.A. Malik D. Tzeng P. Cheng K. Baum, Synthesis of Flourinated Diisocyanates, 1991 The month in the date of publication is not available, J. Org. Chem. 1991, 56, 3043–3044.

Kurt Baum and Aslam A. Malik, Difunctional Monomers Based on Perflouropropylene, 1994 The month in the date of publication is not available, J. Org. Chem. 1994, 59, 6804–6807.

* cited by examiner

*Primary Examiner*—P. Hampton-Hightower
(74) *Attorney, Agent, or Firm*—Huntley & Associates

(57) ABSTRACT

The present invention relates to amine compositions useful in the preparation of polyimides. The polyimides can be used for inducing alignment of a liquid crystal medium with polarized light in liquid crystal display elements.

4 Claims, 1 Drawing Sheet

P-hal $HX(CH_2)n(CF)p(CH_2)nXH$
base
↓

$P-X(CH_2)n(CF)p(CH_2)nXH$ base
↓

$SnCl_2/ethanol$ ↓

Figure
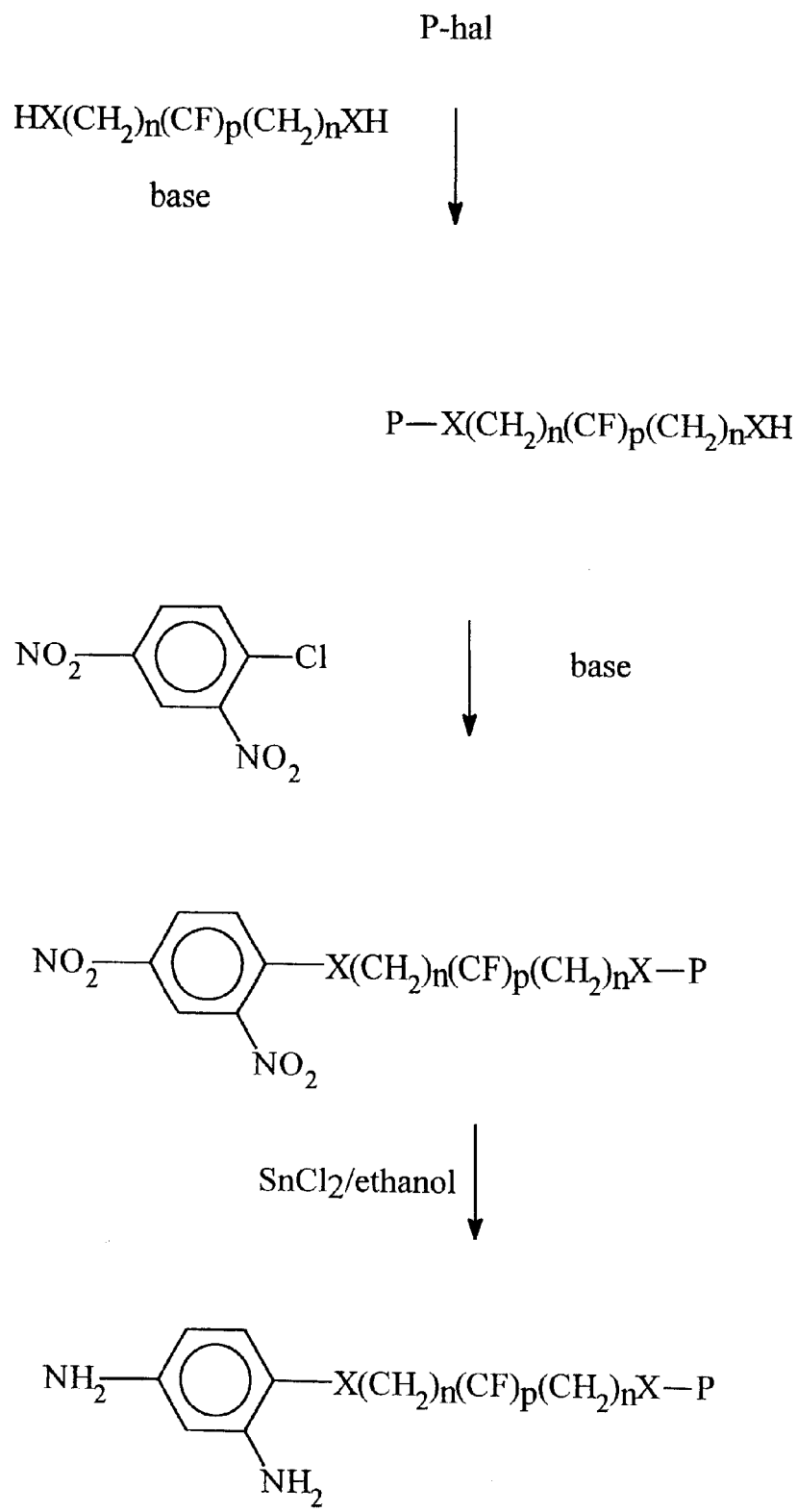

POLYIMIDES FOR OPTICAL ALIGNMENT OF LIQUID CRYSTALS

CROSS-REFERENCE TO RELATED APPLICATION

This application is a division of application Ser. No. 08/859,404 filed May 20, 1997, now U.S. Pat. No. 6,084,057.

This invention was madewith United States Government support under cooperative agreement No. 70NANB4H1525 awarded by the United States Department of Commerce. The United States Government has certain rights in the invention.

BACKGROUND OF THE INVENTION

The present invention relates to compositions useful for inducing alignment of a liquid crystal medium with polarized light and liquid crystal display elements.

Most liquid crystal devices, including displays, have a finite pre-tilt angle, controlled, for instance, by the mechanical buffing of selected polymeric alignment layers. Liquid crystal molecules in contact with such a layer align parallel to the buffing direction, but not exactly parallel to the substrate. The liquid crystal molecules are slightly tilted from the substrate, for instance, by about 0.5–15 degrees. For most display applications, a finite and uniform pre-tilt angle of the liquid crystal is desirable. For other display applications requiring predominately homeotropic alignment of liquid crystals, a much higher pre-tilt angle is desired, for instance, 85–89.9 degrees. In these cases, controlling the pre-tilt by a mechanical rubbing process is very difficult.

A new process for aligning liquid crystals with polarized light was disclosed in U. S. Pat. No. 4,974,941 entitled "Process of Aligning and Realigning Liquid Crystal Media". Controlling the pre-tilt angle of liquid crystals in contact with optical alignment layers, while maintaining high uniformity of alignment, is an important requirement for optical alignment materials. Continuing effort has been directed to the development of compositions for optical alignment of liquid crystals and liquid crystal displays.

SUMMARY OF THE INVENTION

The present invention provides polarizable fluorinated amines of the general formula

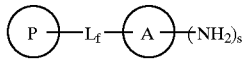

I wherein A is a divalent or trivalent organic moiety, $L_f$ is a divalent organic radical comprising at least four fluorinated carbon atoms; P is a polar group comprising a Pi electron system containing at least one heteroatom selected from the group N, O, and S; and s is 1–2.

The invention further provides polyamic acids prepared from these amines and at least one tetracarboxylic dianhydride and the corresponding polyimides derived therefrom.

The invention further provides a process for inducing pre-tilt in alignment of a liquid crystal using an optical alignment layer bonded to such polyimides, and liquid crystal display elements prepared from such optical alignment layers.

BRIEF DESCRIPTION OF THE FIGURE

The FIGURE is a summary of polarizable fluorinated amines.

DETAILED DESCRIPTION OF THE INVENTION

The polarizable amines of the present invention have been found to be particularly useful in the preparation of polyamic acids and the related polyimides. As used herein, as appropriate, the term "polyimide" also includes the corresponding precursor polyamic acid unless otherwise indicated. The polyimides, in turn, can be used to align liquid crystals. The polyimide compositions provide high uniformity of alignment and can induce a finite pre-tilt to liquid crystals that are optically aligned with polarized light.

The polarizable fluorinated amines of the present invention, when used in the optical alignment of a liquid crystal medium adjacent to a surface of an optical alignment layer, and particularly the polar group within these amines, provides controllable pre-tilt in the liquid crystal.

The polar group P can comprise a two atom system such as a carbonyl group; a three atom Pi system, for example, an enol ether, enamine, etc.; a four atom Pi system, for example an α, β-unsaturated nitrile, ketone, etc.; a five atom system Pi system for example, an α, β-unsaturated ester, an aromatic ring containing a heteroatom, for example, a pyridine indole or benzofuran ring; an aromatic ring with a heteroatom linked through a covalent bond such as a phenoxy or anilino group, a 1,4-substituted phenylene Pi system wherein one or both substituents are heteroatoms; an aromatic ring conjugated to a two, three, four or five atom Pi system, for example, a cinnamate ester; or a 1,4-substituted phenylene Pi system wherein one of the substituents is a heteroatom and the other a two, three, four or five atom Pi system, for example a 4-aminobenzonitrile group.

Preferred polar groups P include photoactive groups that undergo a chemical change upon irradiation with light. Preferred P groups that are photoactive are diaryl ketone, cinnamate, stilbene, arylazo, aryl(diazo), aryl(triazo) and aryl(tetraazo) radicals.

Other preferred polar groups P include liquid crystal radicals comprising a diad, triad or tetraad liquid crystal radical. Examples include 4,4' substituted biphenyl, 4,4' substituted phenyl benzoate, 4,4'-substitute biphenyl benzoate and 4,4' substituted phenyl biphenylcarboxylate radicals.

Other preferred P groups include aromatic rings selected from the group

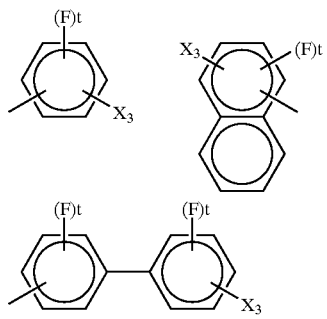

wherein $X_3$ is selected from the group $-N(R_2)_2$, $-CN$, $-NO_2$, wherein $R_2$ is selected from the group H and $C_1-C_4$ hydrocarbon chain.

Within the polarizable amines, diamines are preferred, that is, those compounds in which s=2.

Preferable polarizable fluorinated amines of this invention are diamines of structure III:

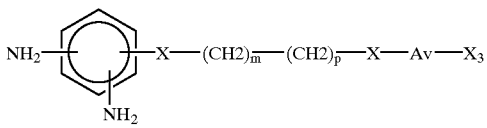

wherein Ar' is selected from the group:

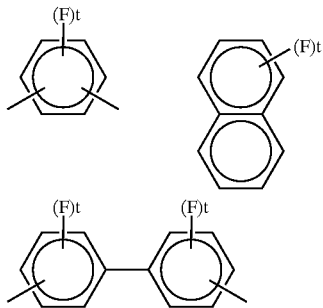

wherein t is equal to up to 4; X, n and p are as described below; and $X_3$ is selected from the group —N(R$_2$)$_2$, —CN, —NO$_2$; wherein $R_2$ is selected from the group H and $C_1$–$C_4$ hydrocarbon chain.

In the polarizable fluorinated amines, preferred are those in which $L_f$ is a moiety of the formula:

wherein —(CF$_2$)$_p$— is a straight chain or branched chain perfluoroalykyl radical, p is 4–20, X is selected from the group consisting of a covalent bond, —O—, —S—and —NR—, wherein R is H or a $C_1$–$C_4$ hydrocarbon, and n is up to 4. Of these, those in which X is —O—, p is 4–12 and n is 1 to 3 have been found to be particularly satisfactory, and are accordingly preferred. Also preferred are those amines in which A is an aromatic ring selected from the group consisting of:

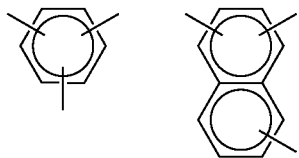

Preferred polyamic acids and polyimides of the invention are the reaction product of at least one tetracarboxylic dianhydride at least one polarizable fluorinated diamine and at least one monoamine of the formula:

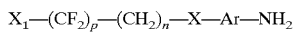

wherein Ar is selected from the group

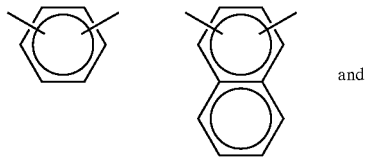
and
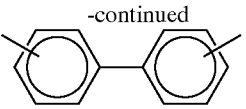

X is selected from the group consisting of —O—, —S—and —NR—and a covalent bond, wherein R is H or a $C_1$ to $C_4$ hydrocarbon, $X_1$ is selected from H and F, n is 0–4 and p is 6–20, wherein the monoamine comprises between 1 mol % and 5 mol % of the amine component and the polarizable fluorinated diamine comprises 2 mol % to 12 mol % of the amine component. Preferably, X is selected from the group —O—and —NR—and n is 1–4.

Preferred monoamines are those wherein Ar is phenyl; X is —O—; n is 1–2; p is 6–18 and $X_1$ is F. A specific monoamine that is most preferred is 4-(1H, 1H-dihydroperfluorooctyloxy)benzeneamine.

Generally, as described in Estes et al., U.S. Pat. No. 5,186,985, a monoamine would be used only as an end-capping entity, and therefore limit the length of the molecule. However, for use in optical alignment processes, lower molecular weight polymers offer the advantage of higher mobility. Thus, the probability of achieving a desired photochemical reaction upon irradiation with polarized light increases.

Synthesis of Monoamines

Monoamines are readily available by reduction of the corresponding nitro derivatives with tin (II) chloride or catalytic reduction with hydrogen and 5% palladium on carbon.

The nitro intermediates are readily available by nucleophilic displacement of 4-fluoronitrobenzene by a variety of monofunctional fluorinated alcohols and amines. Specific conditions for this reaction are outlined in the experimentals below. However, in general, a fluorinated alcohol or amine is stirred with the 4-fluoronitrobenzene in a polar aprotic solvent such as dimethylformamide, N-methylpyrrolidone or dimethylacetamide, in the presence of an organic or inorganic base such as triethylamine, potassium carbonate or potassium hydroxide. Usually, heating to 80° C. will facilitate the reaction.

Monofunctional fluorinated alcohols are commercially available. For instance, 1H,1H,5H-octafluoro-1-pentanol, 1H,1H,7H-perfluoro-1-heptanol, 1H,1H-perfluoro-1-octanol, 1H,1H,2H,2H-perfluoro-1-octanol, 1H,1H,2H,2H-perfluoro-1-decanol 1H,1H,2H,2H-perfluoro-1-dodecanol, 1H,1H2H,2H-perfluoro-9-methyl-1-decanol are available from PCR Inc., Gainesville, Fla. 32602 or Oakwood Products, Inc., West Columbia, S.C. 29169. Other monofunctional fluorinated alcohols are readily available by well known synthetic procedures. For instance, 1H,1H-perfluoro-1-tetradecanol, 1H,1H-perfluoro-1-dodecanol, 1H,1H-perfluoro-1-decanol, 1H,1H,-perfluoro-1-nonanol, 1H,1H, 9H-perfluoro-1-nonanol, 1H,1H-perfluoro-1-heptanol are available by reduction of the corresponding acids or acid chlorides with potassium borohydride according to the procedure of Bilibin, et al., in Macromol. Chem. Phys., 197, 1021–1029, (1966). Alternatively, a mixture of sodium borohydride and aluminum chloride can be used to accomplish the reduction to the alcohol. Other fluorinated alcohols are available by the known radical addition reaction of perfluoroiodides to ω-alkene-1-ols as described in Wang, et al., J. Polym. Prepr. (Am Chem. Soc., Div. Polym. Chem.), 37#2, 815 (1996) or Hopken, et al., New Polym. Mater., 2, 339.

A monofunctional fluorinated amine commercially available is 1H,1H-perfluoro-1-octylamine. Other monofunctinal fluorinated amines are readily available by well known synthetic procedures. For instance, the ethyl esters of the fluorinated acids listed above are readily converted to amides by treatment with ammonia or primary amines. The amides can be readily reduced with diborane in tetrahydrofuran to produce primary and secondary amines. For instance, 1H,1H-perfluoro-1-tetradecylamine, 1H,1H-perfluoro-1-dodecylamine, 1H,1H-perfluoro-1-decylamine, 1H,1H,-perfluoro-1-nonylamine, 1H,1H,9H-perfluoro-1-nonylamine, 1H,1H-perfluoro-1-heptylamine are available by reduction of the corresponding primary amides. N-methyl-1H,1H-perfluoro-1-tetradecylamine, N-methyl-1H, 1H-perfluoro-1-dodecylamine, N-methyl-1H,1H-perfluoro-1-decylamine, N-methyl-1H,1H,-perfluoro-1-nonylamine, N-methyl-1H,1H,9H-perfluoro-1-nonylamine, N-methyl-1H,1H-perfluoro-1-heptylamine are available by reduction of the corresponding N-methyl amides.

Polarizable fluorinated amines of formula I can be readily prepared by the synthesis outlined in FIG. 1. Starting material which can be used is a fluorinated or partially fluorinated diol, diamine, dithiol, or a compound of mixed functionality, for instance, an aminoalcohol. The fluorinated difunctional compound is treated to react selectively at one site with the polar moiety, P, for instance, by nucleophilic displacement of a halogen from the polar moiety. Usually, a polar aprotic solvent such as dimethylformamide, N-methylpyrrolidone, methyl ethyl ketone, acetone, cyclopentanone, cyclohexanone or dimethylacetamide, in the presence of an organic or inorganic base such as triethylamine, potassium carbonate, sodium carbonate or potassium hydroxide is used in the first step. A large excess of the difunctional compound is usually used to insure formation of the desired monofunctional intermediate. Usually, heating to about 80° C. is sufficient to facilitate the reaction, but lower and higher temperatures can be used. The resulting monofunctional intermediate is then treated to react the second functional site, for instance by nucleophilic displacement of halogen from a 2,4-dinitrochlorobenzene. Usually, a polar aprotic solvent such as dimethylformamide, N-methylpyrrolidone, methyl ethyl ketone, acetone, cyclopentanone, cyclohexanone or dimethylacetamide, in the presence of an organic or inorganic base such as triethylamine, potassium carbonate, sodium carbonate or potassium hydroxide is used in the second step. Usually heating to 80° C. is sufficient to facilitate the reaction, but lower and higher temperatures can be used. The nitro and dinitro analogs are then reduced with tin (II) chloride or catalytic reduction with hydrogen and 5% palladium on carbon. Specific reaction conditions for this reduction are described in the examples.

Starting materials for the synthesis of polarizable fluorinated amines are available commercially. For instance, commercially available difunctional fluorinated alcohols are 2,2,3,3,4,4,5,5-octafluoro-1,6-hexanediol, 3,3,4,4,5,5,6,6-octafluoro-1,8-octanediol and 1H,1H,10H,10H-hexadecafluoro-1,10-decanediol, available from Oakland Products, West Columbus, S.C. 29169. The corresponding diacids are also commercially available. These diacids can be converted to N-methyl amides and reduced with diborane in tetrahydrofuran to produce N-methyl diamine derivatives. In this manner, N,N'-dimethyl-2,2,3,3,4,4,5,5-octafluoro-1, 6-hexanediamine, N,N'-dimethyl-3,3,4,4,5,5,6,6-octafluoro-1,8-octanediaminc and manner N,N'-dimethyl-1H1H,10H, 10H-hexadecafluoro-1,10-decanediamine can be prepared.

Other starting materials are available by synthesis. For instance, 3,3,4,4,5,5,6,6,7,7,8,8-dodecafluoro-1,10-decanediamine, 3,3,4,4,5,5,6,6-octafluoro-1,8-diamine, 3,3,4,4,5,5,6,6,7,7,8,8,9,9,10,10-hexadecafluoro-1,12-dodecanediamine are available from the corresponding azides using the procedures described by Malik, et al., Journal Organic Chemistry, 56, 3043 (1991).

Branched chain fluorinated starting materials are available by synthesis. Telomers of perfluoropropylene with α,ω-diiodoperfluoroalkanes are converted to branched-chain difunctional condensation monomers. Reaction of these telomers with ethylene give α,ω-diiodoethylperfluoroalkanes as described by Baum, et al., Journal Organic Chemistry, 59, 6804 (1994). Thus, available are 1,10-diiodo-1H,1H,2H,2H,11H11H,12H,12H-perfluoro-3-methyldecane, 1,12-diiodo-1H,1H,2H,2H,11H,11H,12H, 12H-perfluoro-3-methyldodecane and an isomeric mixture of 1,12-diiodo-1H,1H,2H,2H,11H,11H,12H,12H-perfluorodimethyldodecane. The iodo functional ends can be used directly in alkylation reactions similar to that described in Example 9. The diiodides can be converted to diols by reaction with fuming sulfuric acid. The diiodides can be converted to diamines by conversion to azides and reduction using conventional procedures as described by Baum et al. Thus, available are 1H,1H,2H,2H,11H11H,12H,12H-perfluoro-3-methyl-1,12-dodecanediol, 1H,1H,2H,2H,11H, 11H,12H,12H-perfluoro-3-methyl-1,12-dodecanediamine, 1H,1H,2H,2H,11H11H,12H,12H-perfluoro-3-methyl-1,12-decanediol, 1H,1H,2H,2H,11H11H,12H,12H-perfluoro-3-methyl-1,1 2-decanediamine, isomeric mixtures of 1H,1H, 2H,2H,11H11H,12H,12H-perfluorodimethyl-1,12-dodecanediol, 1H,1H,2H,2H,11H11H,12H,12H-perfluorodimethyl-1,12-dodecanediamine.

The polarizable fluorinated amines can be a blend of monoamines and diamines. Preferably, the monoamine comprises between 1 mol % and 12 mol % of the amine component. Specific diamines of the present invention are illustrated in Table 1.

TABLE 1

Polarizable Fluorinated Diamines

1

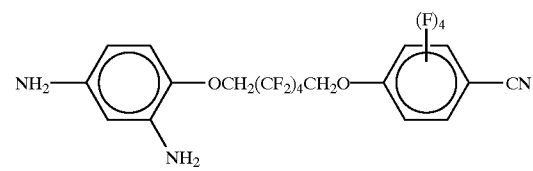

TABLE 1-continued
Polarizable Fluorinated Diamines
2 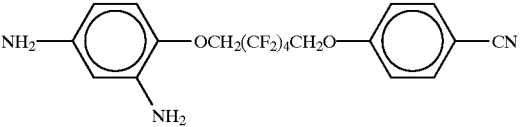
3 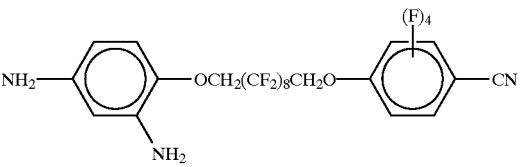
4 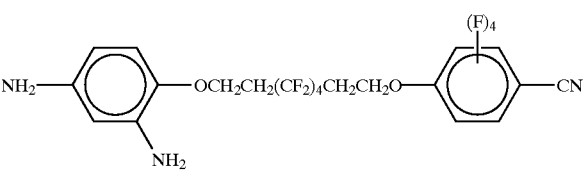
5 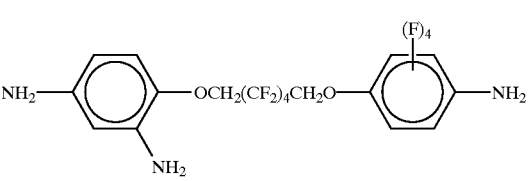
6 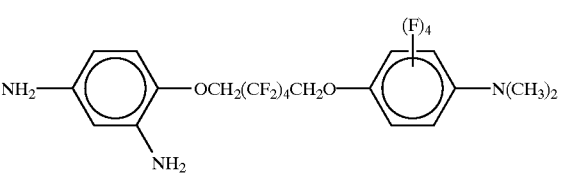
7 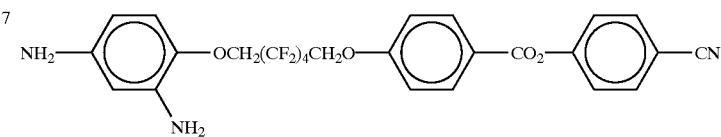
8 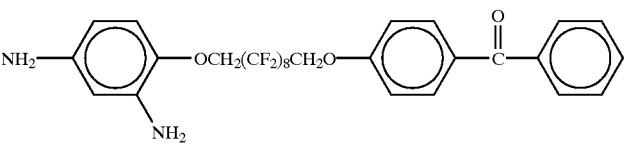
9 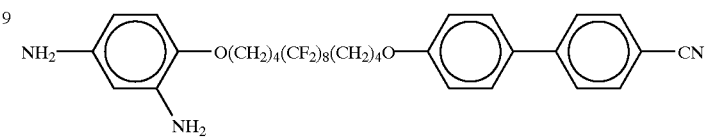
10 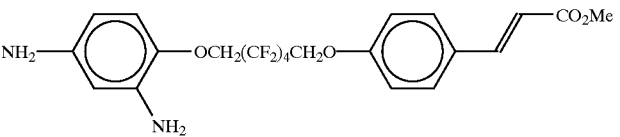

TABLE 1-continued

Polarizable Fluorinated Diamines

11

$NH_2$—⟨ ⟩—$OCH_2(CF_2)_8CH_2O$—⟨ $(F)_4$ ⟩—C(O)—⟨ ⟩

$NH_2$

12

$NH_2$—⟨ ⟩—$NHCH_2CH_2(CF_2)_6CH_2CH_2NH$—⟨ $(F)_4$ ⟩—CN $NH_2$

Diaryl ketone tetracarboxylic dianhydrides especially useful for the invention are those having the following structure:

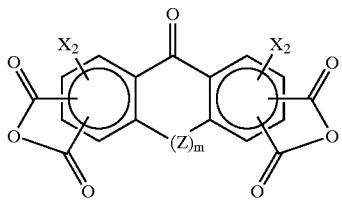

II wherein $X_2$ is independently selected from the group H, CL, F, Br, $R_1$ and $R_1O$—, wherein $R_1$ is independently selected from $C_1$–$C_3$ perflourinated alkyl chain, $C_1$–$C_3$ partially fluorinated alkyl chain and $C_1$–$C_8$ hydrocarbon chain; m is 1 or 0; and Z is selected from the group —S—, —O—, —$SO_2$—, —$CH_2$—, —$C(CF_3)_2$—, —C(O)—, —$CH_2CH_2$—, —NR—and a covalent bond wherein R is a $C_1$–$C_4$ hydrocarbon chain. The more preferred diaryl ketones are 3,3',4,4'-benzophenonetetracarboxylic dianhydride and 2,2'-dichloro-4,4'5,5'-benzophenone tetracarboxylic dianhydride. The most preferred benzophenone tetracarboxylic dianhydride for this invention is 3,3',4,4'-benzophenonetetracaraboxylic dianhydride. Other related photosensitive diaryl ketone dianhydrides described by Pfeifer, et al., in U.S. Pat. No. 4,698,295, herein incorporated by reference, are useful alternatives to the benzophenonetetracarboxylic dianhydrides in the process of this invention.

Another embodiment of the invention is a composition which is the reaction product of at least one diaryl ketone tetracarboxylic dianhydride, an amine component comprising at least two diamines, a polarizable fluorinated diamine and a second diamine, and at least one monoamine of the formula shown above.

Preferred are polyamic acids and polyimide compositions wherein the polarizable fluorinated diamine is of the formula III and more preferred is a polyimide composition wherein the diaryl ketone tetracarboxylic dianhydride is of formula II.

A most preferred polyimide composition is that wherein the diaryl ketone tetracarboxylic dianhydride is 3,3',4,4'-benzophenonetetracarboxylic dianhydride; the polarizable fluorinated diamine is of formula III wherein Ar' is phenyl, t is 4, X is —O—, n is 1, p is 4, $X_3$ is selected from the group —$N(R_2)_2$, —CN, and —$NO_2$ and wherein $R_2$ is selected from H and $C_1$–$C_4$ hydrocarbon chain; and the monoamine is 4-(1H,1H-dihydroperfluorooctyloxy)benzeneamine; wherein and the monoamine comprises 1 mol % to 5 mol % and the polarizable fluorinated diamine comprises 2 mol % to 12 mol % of the amine component.

Another embodiment of the present invention is a polyimide composition which is the reaction product of at least one tetracyclic dianhydride and an amine component comprising at least two diamines including a diaminobenzophenone and a polarizable fluorinated diamine of formula III, and at least one monoamine of the formula shown above, wherein and the monoamine comprises 1 mol % to 5 mol % and the polarizable fluorinated diamine comprises 2 mol % to 12 mol % of the amine component.

The tetracarboxylic dianhydrides useful in forming polyimides for the invention have the structural formula:

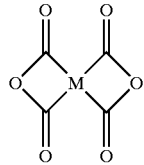

wherein M is a tetravalent organic radical containing at least two carbon atoms, no more than two carbonyl groups of the dianhydride being attached to any one carbon atom of the tetravalent radical.

Specific examples of the tetracarboxylic dianhydride component include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, 3,3'4,4'-benzophenonetetracarboxylic dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-cyclobutanetetracarboxylic dianhydride, 1,2,3,4-butanetetracarboxylic dianhydride, 1,2,3,4- cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives.

Alicyclic tetracarboxylic dianhydrides refer to dianhydrides that are comprised either partially or in whole of saturated carbocyclic rings. The alicyclic tetracarboxylic dianhydrides impart useful solubility properties to polyimides comprising them. Alicyclic tetracarboxylic dianhydrides suitable for the invention are 5-(2,5-dioxotetrahydro)-3-methyl-3-cyclohexene-1,2-dicarboxylic anhydride, commercially available from Chriskev, Inc., 2,3,5-tricarboxycyclopentaneacetic acid dianhydride, available via synthesis by oxidation of dicyclopentadiene with nitric acid; 1,2,3,4-cyclobutanetetracarboxylic dianhydride, 1,2,3,4-butanetetracarboxylic dianhydride, and the like.

A preferred polyimide composition is that wherein the dianhydride component comprises a diaryl ketone tetracarboxylic dianhydride of formula II and an alicyclic tetracarboxylic dianhydride. More preferable is a polyimide wherein the alicyclic dianhydride is between 1–50 mol % of the dianhydride component. Most preferable is a polyimide wherein the alicyclic dianhydride is 5-(2,5-dioxotetrahydro)-3-methyl-3-cyclohexene-1,2-dicarboxylic anhydride.

The amines and tetracarboxylic dianhydrides can be reacted using techniques for the polyimide known in the art, generally by bringing the reactants into contact in an organic solvent to prepare the polyamic acid, and then converting the polyamic acid to polyimide using known techniques.

The organic solvent for polymerization of the amino compound and the dianhydride includes organic polar solvents, such as N-methyl-2-pyrrolidone, dimethylacetamide, dimethylformamide, dimethyl sulfoxide, hexamethylenephosphortriamide, pyridine, etc., and phenols, such as cresol, phenol, xylenol, etc. If desired, these organic solvents can be used in combination with a commonly employed solvent, such as hexane, benzene, toluene, xylene, and alcohols.

The $L_f$ radical is derived from difunctional perfluorinated and partially fluorinated hydrocarbons. 1,16-Dibromo-5,5,6,6,7,7,8,8,9,9,10,10,11,11,12,12-hexadecafluorohexadecane is first prepared by the following procedure:

1,8-diiodoperfluorooctane (65.4 g, Fluorochem, Inc., Azusa, Calif. 91702), 3-buten-1-ol (14.4 g) and azoisobutylnitrile (AIBN, 0.3 g) is heated to 80° C. for 5 hrs. Tributyltin hydride (64.0 g) and additional AIBN (0.3 g) are added and heating is continued for 5 hr. 5,5,6,6,7,7,8,8,9,9,10,10,11,11,12,12-Hexadecafluoro-1,16-hexanediol is purified by kugelrohr distillation under reduced pressure. 5,5,6,6,7,7,8,8,9,9,10,10,11,11,12,12-Hexadecafluoro-1,16-hexadecanediol (27.3 g) and 48% aqueous hydrobromic acid is heated to 80° C. for 24 hrs. The mixture is diluted with water, extracted with ethyl ether, and washed several times with water. The extracts are dried (MgSO$_4$) and concentrated. The material is kugelrohr distilled under reduced pressure to give 1,1 6-dibromo-5,5,6,6,7,7,8,8,9,9,10,10,11,11,12,12-hexadecafluorohexadecane. 3,3,4,4,5,5,6,6,-octafluoro-1,8-octanediamine is first prepared by the procedures described by Malik et al., Journal Organic Chemistry, 56, 3043 (1991).

The examples of the invention use a fluorinated monoamine that was prepared by synthesis. 4-(1H,1H-perfluorooctyloxy)benzeneamine was made by the following procedure:

A mixture of 4-fluoronitrobenzene (2.2 g, 15.6 nm*mol*), 1H,1H-perfluorooctanol (5.95 g, 14.9 mmol), potassium carbonate (2.35 g, 17.0 mmol) in dimethylacetamide (20 mL) and toluene (20 mL) was heated to reflux with a Dean Stark apparatus for 25 hrs. The mixture was cooled, diluted with water and extracted with ethyl ether. The extracts were washed with water, dried (MgSO$_4$), and concentrated to an oil (7.0 g). The oil was taken up in ethanol (60 mL) with tin chloride dihydrate (12.12 g, 54 mmol) and heated for 4 hrs at 60° C. The mixture was poured into ice water, basified with potassium hydroxide (9.0 g) and extracted with ether-tetrahydrofuran (2:1). The extracts were washed with brine (3 times), dried (MgSO$_4$), and concentrated to an oil. Chromatography on silica gel was followed by recrystallization from hexane-ether to give crystals (3.0 g, mp 49.1–50.2° C.).

EXAMPLE 1

This example illustrates synthesis of a polarizable fluorinated diamine 1.

A mixture of 2,2,3,3,4,4,5,5-octafluoro-1,6-hexanediol (7.76 g, 29.6 mmol, Aldrich Chemical Co., Milwaukee, Wis.), 1-chloro-2,4-dinitrobenzene (2.0 g, 10 mmol), potassium carbonate (1.36 g, 10 mmol) and N-methylpyrrolidone (50 mL, NMP) was heated to 80° C. for 20 hrs. The mixture was diluted with water, acidified with hydrochloric acid, and extracted with ether. Thee extracts were washed with water, concentrated and the excess hexanediol removed by Kugelrohr distillation.

The residual oil (4.23 g) was treated with pentafluorobenzonitrile (1.91 g, 10 mmol), triethyl amine (1.0 g, 10 mmol) and NMP (50 mL) at room temperature for 75 minutes. The mixture was diluted with water, acidified, and extracted with ethyl ether-tetrahydrofuran (4:1). The extracts were washed with water, dried (MgSO$_4$) and concentrated. The resulting oil was chromatographed to give 4-[6-(2,4-dinitrophenoxy)-2,2,3,3,4,4,5,5-octaflurohexyloxy]-2,3,5,6-tetrafluorobenzonitrile (4.5 g).

The benzonitrile was treated with tin chloride dihydrate (16.9 g, 75 mmol) and ethanol (100 mL) at 35° C. for 24 hrs. The mixture was poured into ice water, basified with potassium hydroxide (12.6 g), and extracted with ethyl ether-tetrahydrofuran (3:1). The extracts were washed with water and brine, dried (MgSO$_4$) and concentrated. The material was chromatographed and recrystallized from hexane-ethyl acetate to give diamine 1 (1.2 g, mp 95.8-97.0° C.).

EXAMPLE 2

This example illustrates synthesis of a polarizable fluorinated diamine 2.

A mixture of 2,2,3,3,4,4,5,5-octafluoro-1,6-hexanediol (15.7 g), 4-fluorobenzonitrile (2.42 g), potassium carbonate (1.36 g) and N-methylpyrrolidone (50 mL) was heated to 80° C. for 18 hrs. The mixture was diluted with water and extracted with ether. The extracts were washed with water and brine, and dried (MgS0$_4$) and the excess diol removed by distillation. The pot residue was taken up in ethanol, cooled, and a by-product removed by filtration. The ethanol was removed to give a yellow solid (mp 95–97° C.).

The solid (5.1 g) was treated with 2,4-dinitrochlorobenzene (3.4 g), potassium carbonate (3.8 g) and NMP (20 mL) for about 24 hrs. at 72–76° C. The mixture was diluted with water, extracted with ethyl ether, washed with water and concentrated to give a yellow oil (8.3 g). Chromatography and recrystallization from ethanol gave 4-[6-(2,4-dinitrophenoxy)-2,2,3,3,4,4,5,5- octaflurohexyloxy]benzonitrile, 2.0 g, mp 89.0–90.6° C. 4-[6-(2,4-Dinitrophenoxy)-2,2,3,3,4,4,5,5-octaflurohexyloxy]benzonitrile (1.85 g) in ethanol (50 mL) was agitated with 5% palladium on carbon at 30 psi hydrogen atmosphere for 3 hrs. The solution was filtered through glass fiber mats and the ethanol removed. The red oil was purified by chromatography to give 0.30 g of diamine 2 as a colorless oil.

EXAMPLE 3

1H,1H,10H,10H-hexadecafluoro-1,10-decandediol (Oakland Products, West Columbus, S.C. 29169) is processed as described in Example 1 to give the diamine 3.

EXAMPLE 4

3,3,4,4,5,5,6,6-octafluoro-1,8-octanediol (Oakland Products, West Columbus, S.C. 29169) is processed as described in Example 1 to give the diamine 4.

EXAMPLE 5

1-(6-hydroxy-2,2,3,3,4,4,5,5-octafluorohexyloxy)-2,4-dinitrobenzene (3.7 g) was treated with pentafluoronitrobenzene (2.21 g) and triethylamine (0.96 g) in NMP (5 mL) for 18 hrs at room temperature. The mixture was diluted with water, acidified with hydrochloric acid, and extracted with ethyl ether. The extracts were washed with water, dried ($MgSO_4$), concentrated and purified by chromatography to give 4-[6-(2,4-dinitrophenoxy)-2,2,3,3,4,4,5,5-octaflurohexyloxy]-2,3,5,6-tetrafluoronitrobenzene (5.0 g) as an oil.

4-[6-(2,4-Dinitrophenoxy)-2,2,3,3,4,4,5,5-octaflurohexyloxy]-2,3,5,6-tetrafluoronitrobenzene (5.0 g) was treated with tin chloride dihydrate as described in Example 1. Purification of the product by chromatography gave diamine 5 (1.2 g, mp at room temperature).

EXAMPLE 6

This example illustrates synthesis of a polarizable fluorinated diamine 6.

A mixture of 2,2,3,3,4,4,5,5-octafluoro-1,6-hexanediol (7.86 g) was treated with pentafluoronitrobenzene (2.13 g) and triethylamine (1.39 mL) in NMP (15 mL) at room temperature for 1 hr. The mixture was diluted with water, acidified with acetic acid, and extracted with ethyl ether. The extract was washed with water and brine; dried ($MgSO_4$) and concentrated. Excess diol was removed by distillation and the residual oil purified by chromatography to give 4-(6-hydroxy-2,2,3,3,4,4,5,5-octafluorohexyloxy) tetrafluoronitrobenzene (3.06 g).

A solution of the 4-(6-hydroxy-2,2,3,3,4,4,5,5-octafluorohexyloxy)-2,3,5,6-tetrafluoronitrobenzene (2.0 g) in ethanol (50 mL) was treated with tin (II) chloride dihydrate (9.9 g) at 60° C. for 18 hrs. under a nitrogen atmosphere. The mixture was diluted with ice water, basified with potassium hydroxide (10.1 g) in water (80 mL) and extracted with ethyl ether. The extracts were washed with water and brine, dried ($K_2CO_3$), and concentrated to an oil. The oil was purified by chromatography to give 4-(6-Hydroxy- 2,2,3,3,4,4,5,5-octafluorohexyloxy)-2,3,5,6-tetrafluorobenzeneamine as an oil (1.77 g).

The 4-(6-hydroxy-2,2,3,3,4,4,5,5-octafluorohexyloxy)-2,3,5,6-tetrafluorobenzeneamine (0.70 g) was treated with methyl iodide (0.41 mL) in NMP (4 mL) and sodium bicarbonate (0.27 g) at 50° C. followed by further addition of methyl iodide (0.41 mL portions) after 2, 18 and 20 hrs. At 22 hrs. the mixture was diluted with water and extracted with ethyl ether. The extracts were washed with water and brine, dried ($K_2CO_3$), and concentrated to the dimethylamino derivative as an oil (0.76 g).

N,N-Dimethyl-4-(6-hydroxy-2,2,3,3,4,4,5,5-octafluorohexyloxy)-2,3,5,6-tetrafluorobenzeneamine (1.05 g) was treated with 1-chloro-2,4-dinitrobenzene (0.51 g) and potassium carbonate (0.35 g) in NMP (5 mL) at 80° C. for 21.5 hrs. The mixture was diluted with water and extracted with ethyl ether. The extracts were washed with water and brine, dried ($K_2CO_3$), and concentrated to an orange oil. The oil was purified by chromatography to give N,N-dimethyl-4-[6-(2,4-dinitrophenoxy)-2,2,3,3,4,4,5,5-octaflurohexyloxy]-2,3,5,6-tetrafluorobenzeneamine (1.05 g) as an oil.

The dinitro compound was reduced with tin chloride dihydrate as described above and the resulting oil purified by chromatography and recrystallization to give the diamine 6 (0.07 g, mp 52.0–53.2° C.).

EXAMPLE 7

This example illustrates formation of a polarizable fluorinated diamine 7.

A mixture of 2,2,3,3,4,4,5,5-octafluoro-1,6-hexanediol (7.86 g), 4-fluoroacetophenone (1.36 g), NMP (10 mL), and potassium carbonate (4.14 g) is heated to 95–100° C. for 48 hrs. The mixture is further processed as described in Example 1 to provide 4-(6-hydroxy-2,2,3,3,4,4,5,5-octafluorohexyloxy)acetophenone.

4-(6-Hydroxy-2,2,3,3,4,4,5,5-octafluorohexyloxy) acetophenone (3.78 g), 2,4-dinitrochlorobenzenc (2.42 g) potassium carbonate (2.76 g) and NMP (15 mL) are heated to 75–80° C. for 24 hrs. The solution is further processed as described in Example 2 to give 4-[6-(2,4-dinitrophenoxy)-2,2,3,3,4,4,5,5-octaflurohexyloxy]acetophenone.

4-[6-(2,4-Dinitrophenoxy)-2,2,3,3,4,4,5,5-octaflurohexyloxy]acetophenone (6.44 g) and sodium hydroxide solution (20 g 20 wt %) is treated with sodium hypochlorite (56 mL, 5.25 wt % solution) in 1,2-dimethoxyethane (200 mL) at 50–60° C. until the acetophenone disappears as indicated by monitoring with thin layer chromatography. Heating is continued for 2 hrs and the solvent is removed under reduced pressure. The mixture is diluted with water and excess hypochlorite neutralized with sodium bisulfite. The solution is acidified with hydrochloric acid and extracted with ethyl ether. The extracts are washed with brine, dried ($MgSO_4$) and concentrated give 4-[6-(2,4-dinitrophenoxy)-2,2,3,3,4,4,5,5-octaflurohexyloxy]benzoic acid.

4-[6-(24-[6-(2,4-Dinitrophenoxy)-2,2,3,3,4,4,5,5-octaflurohexyloxy]benzoic acid (6.46 g), toluene (30 mL), oxalyl chloride (2.0 g) and 1 drop of anhydrous dimethyl formamide is stirred for 16 hrs. at room temperature under a nitrogen atmosphere. Excess oxalyl chloride and toluene (10 mL) is removed by reduced pressure distillation. The remaining acid chloride solution is added to a solution of 4-cyanophenol (1.31 g), toluene (20 mL) and triethylamine (1.5 g) and the mixture is stirred 24 hrs. at 50–60° C. under a nitrogen atmosphere. The solution is diluted with water, slightly acidified with hydrochloric acid, and extracted with toluene-ethyl ether. The extracts are washed with water and brine, dried ($MgSO_4$), concentrated, and purified by chromatography to give the 4-cyanophenyl 4-[6-(2,4-dinitrophenoxy)-2,2,3,3,4,4,5,5-octaflurohexyloxy] benzoate.

4-Cyanophenyl 4-[6-(2,4-dinitrophenoxy)-2,2,3,3,4,4,5, 5-octaflurohexyloxy]benzoate (7.63 g), in ethanol (100 mL)

is agitated with 5% palladium on carbon (0.8 g) at 40 psi hydrogen atmosphere for 8 hrs. The solution is filtered through glass fiber mats and the ethanol removed. The product is purified by chromatography to give the diamine 7.

EXAMPLE 8

This example illustrates formation of polarizable fluorinated diamine 8.

1H,1H,10H,10H-Hexadecafluoro-1,10-decandediol (13.86 g), 4-fluorobenzophenone (2.0 g), potassium carbonate (4.14 g) and NMP (10 mL) is heated to 95–100° C. for 48 hrs. The mixture is further processed as described in Example 1 to provide 4-(10-hydroxy-2,2,3,3,4,4,5,5,6,6,7,7,8,8,9,9-hexadecafluorodecyloxy)benzophenone.

A solution of 4-(10-Hydroxy-2,2,3,3,4,4,5,5,6,6,7,7,8,8,9,9-hexadecafluorodecyloxy)benzophenone (6.42 g), 2,4-dinitrochlorobenzene (2.42 g) potassium carbonate (2.76 g) and NMP (15 mL) is heated to 75–80° C. for 24 hrs. The solution is further processed as described in Example 2 to give 4-[10-(2,4-dinitrophenoxy)-2,2,3,3,4,4,5,5,6,6,7,7,8,8,9,9-hexadecafluorodecyloxy]benzophenone.

4-[10-(2,4-Dinitrophenoxy)-2,2,3,3,4,4,5,5,6,6,7,7,8,8,9,9-hexadecafluorodecyloxy]benzophenone (8.08 g) is treated with tin (II) chloride dihydrate as described in Example 1 and purified by chromatography to give diamine 8.

EXAMPLE 9

This example illustrates formation of polarizable fluorinated diamine 9.

A solution of 1,16-dibromo- 5,5,6,6,7,7,8,8,9,9,10,10,11,11,12,12-hexadecafluorohexadecane (20.16 g), 4'-hydroxy-4-cyanobiphenyl (2.05 g), potassium carbonate (2.07 g) and acetone (30 mL) is refluxed for 8 hrs. The acetone is removed under reduced pressure and the residue diluted with water and extracted with ethyl ether. The extracts are washed with water and brine, dried (MgSO$_4$), concentrated, and purified by chromatography to give 4'-(16-bromo-,5,5,6,6,7,7,8,8,9,9,10,10,11,11,12,12-hexadecafluorohexadecyloxy)-4-cyanobiphenyl.

4'-(16-Bromo-,5,5,6,6,7,7,8,8,9,9,10,10,11,11,12,12-hexadecafluorohexadecyloxy)-4-cyanobiphenyl (7.96 g), 2,4-dinitrophenol (2.21 g), potassium carbonate (1.65 g) and NMP (10 ML) is heated to 80–85° C. under a nitrogen atmosphere for 18 hrs. The solution is diluted with water and extracted with ethyl ether. The extracts are washed with water and brine, dried (MgSO$_4$), concentrated, and purified by chromatography to give 4'-[16-(2,4-dinitrophenoxy)-,5,5,6,6,7,7,8,8,9,9,10,10,11,11,12,12-hexadecafluorohexadecyloxy)-4-cyanobiphenyl.

The above dintiro compound (8.99 g) is reduced with palladium on carbon as described in Example 7 to give diamine 9.

EXAMPLE 10

This example illustrates formation of polarizable fluorinated diamine 10.

A mixture of 2,2,3,3,4,4,5,5-octafluoro-1,6-hexanediol (7.86 g), 4-fluorobenzaldehyde (1.24 g), NMP (10 mL), and potassium carbonate (4.14 g) was heated to 95–100° C. for 48 hrs. The mixture was further processed as described in Example 1 to provide 4-(6-hydroxy-2,2,3,3,4,4,5,5-octafluorohexyloxy)benzaldehyde.

4-(6-hydroxy-2,2,3,3,4,4,5,5-octafluorohexyloxy)benzaldehyde (3.66 g) 2,4-dinitrochlorobenzene (2.42 g) potassium carbonate (2.76 g) and NMP (15 mL) are heated to 75–80° C. for 24 hrs. The solution is further processed as described in example 2 to give 4-[6-(2,4-dinitrophenoxy)-2,2,3,3,4,4,5,5-octaflurohexyloxy]benzaldehyde.

To a mixture of trimethylsilyl diethylphosphonoacetate (2.97 g) in anhydrous tetrahydrofuran (100 mL) at 0° C. is added 1.6 M solution of butyllithium in hexane (6.9 mL). The reaction is stirred for 2 hrs. at room temperature and then treated with 4-[6-(2,4-dinitrophenoxy)-2,2,3,3,4,4,5,5-octaflurohexyloxy]benzaldehyde (5.32 g) in anhydrous tetrahydrofuran (30 mL). The mixture is stirred for a further 2 hrs., diluted with water and extracted with ethyl ether. The extracts are washed with water and brine, dried (MgSO$_4$), concentrated, and purified by crystallization to give 4-[6-(2,4-dinitrophenoxy)-2,2,3,3,4,4,5,5-octaflurohexyloxy]cinnamic acid. The acid is converted to the methyl ester by treatment with diazomethane in ether solution.

The resulting dinitro methyl cinnamate ester (6.04 g) is reduced with tin (II) chloride as described in Example 7 and is purified by chromatography to give diamine 10.

EXAMPLE 11

This example illustrates formation of polarizable fluorinated diamine 11.

1H,1H,10H,10H-Hexadecafluoro-1,10-decandediol (13.86 g), 2,3,4,5,6-pentafluorobenzophenone (2.72 g), potassium carbonate (4.14 g) and NMP (10 mL) is heated to 80° C. until the starting benzophenone dissipates by TLC analysis. The mixture is further processed as described in Example 1 to provide 4-(10-hydroxy-2,2,3,3,4,4,5,5,6,6,7,7,8,8,9,9-hexadecafluorodecyloxy)-2,3,4,5,6-pentafluorobenzophenone.

A solution of 4-(10-Hydroxy-2,2,3,3,4,4,5,5,6,6,7,7,8,8,9,9-hexadecafluorodecyloxy)-2,3,4,5,6-pentafluorobenzophenone(7.14 g), 2,4-dinitrochlorobenzene (2.42 g) potassium carbonate (2.76 g) and NMP (15 mL) is heated to 75–80° C. for 24 hrs. The solution is further processed as described in example 2 to give 4-[10-(2,4-dinitrophenoxy)-2,2,3,3,4,4,5,5,6,6,7,7,8,8,9,9-hexadecafluorodecyloxy]-2,3,4,5,6-pentafluorobenzophenone.

4-[10-(2,4-Dinitrophenoxy)-2,2,3,3,4,4,5,5,6,6,7,7,8,8,9,9-hexadecafluorodecyloxy]-2,3,4,5,6-pentafluorobenzophenone (8.90 g) is treated with tin (II) chloride dihydrate as described in Example 1 and purified by chromatography to give diamine 11.

EXAMPLE 12

A mixture of 3,3,4,4,5,5,6,6,-octafluoro-1,8-octanediamine (78.0 g), 1-chloro-2,4-dinitrobenzene (2.0 g, 10 mmol), potassium carbonate (1.36 g, 10 mmol) and N-methylpyrrolidone (50 mL, NMP) is heated to 80° C. for 20 hrs. The mixture is diluted with water and extracted with ether. The extracts are washed with water, concentrated and the excess octanediamine removed by Kugelrohr distillation.

The residue is treated with pentafluorobenzonitrile (1.91 g, 10 mmol), triethyl amine (1.0 g, 10 mmol) and NMP (50 mL) at room temperature for 75 minutes. The mixture is diluted with water and extracted with ethyl ether-tetrahydrofuran (4:1). The extracts are washed with water, dried (K$_2$CO$_3$) and concentrated. The resulting material is chromatographed to give 4-[6-(2,4-dinitroanilino-3,3,4,4,5,5,6,6,-octafluorooctylamino]-2,3,5,6-tetrafluorobenzonitrile.

The benzonitrile is treated with tin chloride dihydrate (16.9 g, 75 mmol) and ethanol (100 mL) at 35° C. for 24 hrs. The mixture is poured into ice water, basified with potassium hydroxide (12.6 g), and extracted with ethyl ether-tetrahydrofuran (3:1). The extracts are washed with water and brine, dried ($MgSO_4$) and concentrated. The material is chromatographed and recrystallized to give diamine 12.

EXAMPLE 13

This example illustrates the use of diamine 1 in a poly(amic acid) formulation and the use of the poly(amic acid) to prepare a polyimide optical alignment layer for alignment of liquid crystals.

To a solution of 5-(trifluoromethyl)-1,4-benzenediamine (82.5 mg) and diamine 1 (13.5 mg) in γ-butyrolactone (1.24 g) was added 3,3',4,4'-benzophenonetetracarboxylic dianhydride (161.1 mg) at room temperature under a nitrogen atmosphere. The mixture was stirred for 0.5 hr and 4-(1H,1H-dihydroperfluorooctyloxy)benzeneamine (6.1 mg) was added followed by stirring for 23 hrs. at room temperature. The mixture was diluted with γ-butyrolactone (3.76 g) before spinning optical alignment layers.

Two 0.9 inch by 1.2 inch by 1 millimeter thick borosilicate glass substrates with transparent indium-tin-oxide (ITO) electrode coatings (Donnelly Corp., Holland, Mich.) were spin-coated and cured with the polyimide formulation to give optical alignment layers. Spin coating was achieved by filtering the prepolymer solution through a 0.45 mm Teflon filter membrane directly onto the surface of the clean ITO glass substrates. The coated ITO glass substrates were then spun at 2500 RPM for 1 minute to produce uniform thin films. The resultant thin films were cured under nitrogen for 0.25 hrs. at 80° C. followed by 1 hr. at 180° C.

The coated substrates were exposed to ultraviolet polarized light (300–400 nm) using an Innova 400 (Coherent Incorporated, Santa Clara, Calif.) laser.

A twisted nematic liquid crystal cell was constructed from the two exposed coated substrates. Four micron spacers were mixed in with an epoxy and the epoxy mixture was placed at the edges of the coated side on one exposed substrate. The second exposed substrate was placed on top of the first substrate such that the alignment layers were facing each other and the respective background alignment directions were perpendicular to each other. The substrates were pressed to a four micrometer spacing using clamps and the fiber spacer/epoxy mixture was allowed to cure. Two spaces on opposite sides of the cell were left unsealed so that the liquid crystal would fill the cell along the bisector between the alignment directions of the substrates. The cell was placed in a vacuum and, subsequently, one unsealed opening on the cell was dipped into a nematic liquid crystal doped with chiral compound. After filling, the cell was removed from the liquid crystal and vacuum, cleaned up, and the spaces sealed with epoxy. The cell was subsequently heated above the nematic-isotropic transition of the liquid crystal to remove any defects introduced during filling.

The cell was viewed between parallel and crossed polarizers on a photographic light box. For the two polarizer configurations, the transmission of the cell was consistent with a twisted nematic orientation of the liquid crystal and the cell gave a net uniform twisted nematic alignment. The pre-tilt angle was measured using the crystal rotation method to be approximately 1 degree.

EXAMPLE 14

This example further illustrates the use of diamine 1 in a poly(amic acid) formulation and the use of the poly(amic acid) to prepare a polyimide optical alignment layer for alignment of liquid crystals.

To a solution of 5-(trifluoromethyl)-1,4-benzenediamine (79.2 mg), 4-(1H,1H-perfluorooctyloxy)benzeneamine (12.3 mg) and diamine 1 (13.5 mg) in γ-butyrolactone (1.08 g) was added 3,3',4,4'-benzophenonetetracarboxylic dianhydride (161.1 mg) at room temperature under a nitrogen atmosphere followed by stirring for 22.5 hrs. at room temperature. The mixture was diluted with y-butyrolactone (3.97 g) before spinning optical alignment layers.

The substrates were coated and processed as described in example 13 and the exposure conditions were adjusted accordingly for this formulation. The pre-tilt was measured to be approximately 55 degrees.

EXAMPLE 15

This example further illustrates the use of diamine 1 in a poly(amic acid) formulation and the use of the poly(amic acid) to prepare a polyimide optical alignment layer for alignment of liquid crystals.

To a solution of 5-(trifluoromethyl)-1,4-benzenediamine (164.2 mg), 4-(1H,1H-perfluorooctyloxy)benzeneamine (17.2 mg) and diamine 1 (27.1 mg) in γ-butyrolactone (1.79 g) was added 3,3',4,4'-benzophenonetetracarboxylic dianhydride (290.0 mg) and 5-(2,5-dioxotetrahydro)-3-methyl-3-cyclohexene-1,2-dicarboxylic anhydride (26.4 mg) followed by stirring for 23 hr at room temperature. The mixture was diluted with γ-butyrolactone (8.17 g) before spinning optical alignment layers.

The substrates were coated and processed as described in Example 13, the exposure conditions were adjusted accordingly for this formulation. The results were the same as Example 13 except that the pre-tilt was measured to be approximately 2 degrees.

EXAMPLE 16

This example further illustrates the use of diamine 1 in a poly(amic acid) formulation and the use of the poly(amic acid) to prepare a polyimide optical alignment layer for alignment of liquid crystals.

To a solution of 5-(trifluoromethyl)-1,4-benzenediamine (73.7 mg), 4-(1H,1H-perfluorooctyloxy)benzeneamine (6,1 mg), 4,4'diaminobenzophenone (10.6 mg) and diamine 1 (13.5 mg) in γ-butyrolactone (1.02 g) was added 3,3',4,4'-benzophenonetetracarboxylic dianhydride (145.0 mg) and 5-(2,5-dioxotetrahydro)-3-methyl-3-cyclohexene-1,2-dicarboxylic anhydride (13.2 mg) followed by stirring for 23 hrs. at room temperature. The mixture was diluted with -butyrolactone (3.96 g) before spinning optical alignment layers.

The substrates were coated and processed as described in Example 13, the exposure conditions were adjusted accordingly for this formulation. The results were the same as Example 13 except that the pre-tilt was measured to be approximately 2 degrees.

EXAMPLE 17

This example illustrates the use of diamine 5 in a poly(amic acid) formulation and the use of the poly(amic acid)

to prepare a polyimide optical alignment layer for alignment of liquid crystals.

To a solution of 5-(trifluoromethyl)-1,4-benzenediamine (83.6 mg) and diamine 5 (13.3 mg) in γ-butyrolactone (1.80 g) was added 3,3',4,4'-benzophenonetetracarboxylic dianhydride (161.1 mg) at room temperature under a nitrogen atmosphere and the solution was stirred for 23 hrs. at room temperature. The mixture was diluted with γ-butyrolactone (3.10 g) before spinning optical alignment layers.

The substrates were coated and processed as described in Example 13, the exposure conditions were adjusted accordingly for this formulation. The results were the same as Example 13 except that the pre-tilt was measured to be approximately 0 degrees. The cell showed very good uniformity of alignment.

EXAMPLE 18

This example illustrates the use of diamine 6 in a poly(amic acid) formulation and the use of the poly(amic acid) to prepare a polyimide optical alignment layer for alignment of liquid crystals.

To a solution of 5-(trifluoromethyl)-1,4-benzenediamine (83.6 mg) and diamine 6 (14.0 mg) in γ-butyrolactone (1.30 g) was added 3,3',4,4'-benzophenonetetracarboxylic dianhydride (161.1 mg) at room temperature under a nitrogen atmosphere and the solution was stirred for 23 hrs. at room temperature. The mixture was diluted with y-butyrolactone (3.62 g) before spinning optical alignment layers.

The substrates were coated and processed as described in Example 13, the exposure conditions were adjusted accordingly for this formulation. The results were the same as Example 13 except that the pre-tilt was measured to be approximately 0 degrees. The cell showed very good uniformity of alignment.

We claim:

1. A liquid crystal display element comprising an optical alignment layer comprising a polyimide denoted by the formula

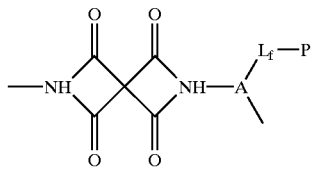

wherein A is a trivalent organic moiety, $L_f$ is a divalent organic radical comprising at least four fluorinated carbon atoms; P is a polar group comprising a Π electron system containing at least one heteroatom selected from the group N, O and S; and M is a tetravalent organic radical containing at least two carbon atoms, with no more than two carbonyl groups being attached to any one carbon atom of the tetravalent radical.

2. A liquid crystal display element of claim 1 wherein M comprises at least one tetravalent organic moiety of the general formula

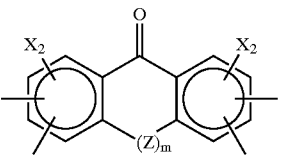

wherein $X_2$ is independently selected from the group H, CL, F, Br, $R_1$ and $R_1O$—, wherein $R_1$ is independently selected from $C_1$–$C_3$ perflourinated alkyl chain, $C_1$–$C_3$ partially flourinated alkyl chain and $C_1$–$C_8$ hydrocarbon chain; m is 1 or 0; and Z is selected from the group —S—, —O—, —$SO_2$—, —$CH_2$—, —$C(CF_3)_2$—, —C(O)—, —$CH_2CH_2$—, —NR—and a covalent bond wherein R is a $C_1$–$C_4$ hydrocarbon chain.

3. A liquid crystal display element of claim 1 wherein A is selected from the group consisting of

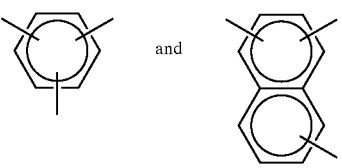

P is selected from the group consisting of:

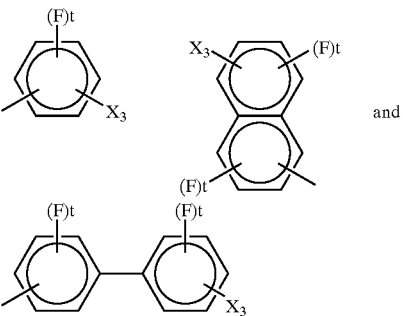

wherein —$X_3$ is selected from the group —$N(R_2)_2$, —CN, and —$NO_2$, t is equal to 0–4; $L_f$ consists essentially of:

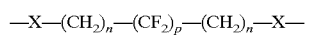

wherein —$(CF_2)_p$— is a straight chain or branched chain perfluoroalkyl radical, p is 4–20, X is selected from the group consisting of a covalent bond, —O—, —S— and —NR—, wherein R is selected from H and $C_1$–$C_4$ hydrocarbon, and n is up to 4.

4. A liquid crystal display element of claim 2 wherein the polyimide comprises the formula

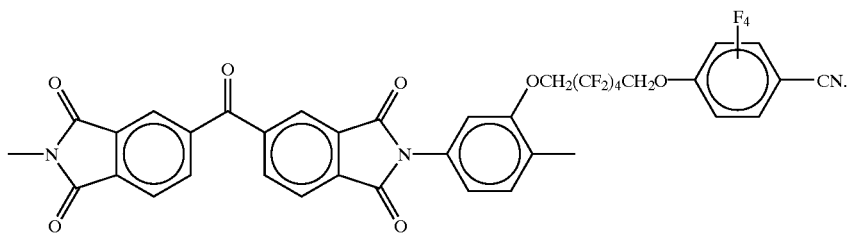
* * * * *

UNITED STATES PATENT AND TRADEMARK OFFICE
CERTIFICATE OF CORRECTION

PATENT NO. : 6,451,960 B1  
DATED : September 17, 2002  
INVENTOR(S) : Wayne M. Gibbons et al.

It is certified that error appears in the above-identified patent and that said Letters Patent is hereby corrected as shown below:

Column 19,
Lines 47-55, change the structure

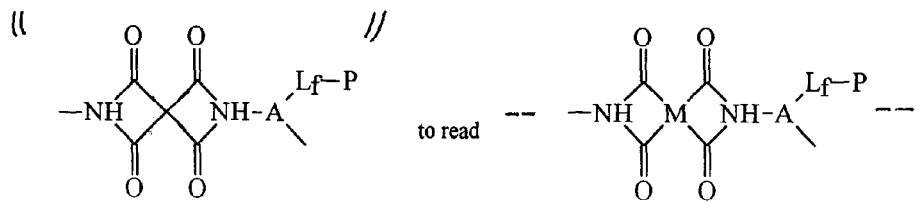

Line 58, change "I I" to read -- II --.

Signed and Sealed this

Twenty-first Day of January, 2003

JAMES E. ROGAN
*Director of the United States Patent and Trademark Office*